United States Patent
Niguet et al.

(10) Patent No.: US 10,120,407 B2
(45) Date of Patent: Nov. 6, 2018

(54) SEALED JOYSTICK FOR THE CONTROL OF A MACHINE, SEALING ELEMENT FOR THAT JOYSTICK AND A CONTROL PANEL INCORPORATING THAT JOYSTICK

(71) Applicant: Crouzet Automatismes, Valence (FR)

(72) Inventors: Ludovic Niguet, Toulaud (FR); Thierry Vinard, Chabeuil (FR); Fabien Ville, Saint-Peray (FR); Fabien Pelaez, Saint-Peray (FR)

(73) Assignee: Crouzet Automatismes, Valence (FR)

( * ) Notice: Subject to any disclaimer, the term of this patent is extended or adjusted under 35 U.S.C. 154(b) by 174 days.

(21) Appl. No.: 15/216,439

(22) Filed: Jul. 21, 2016

(65) Prior Publication Data
US 2017/0031382 A1 Feb. 2, 2017

(30) Foreign Application Priority Data
Jul. 22, 2015 (FR) ..................... 15 56938

(51) Int. Cl.
| | |
|---|---|
| *G05G 25/04* | (2006.01) |
| *G05G 9/047* | (2006.01) |
| *B60K 37/06* | (2006.01) |
| *B66C 13/56* | (2006.01) |
| *E02F 9/20* | (2006.01) |
| *F16J 15/06* | (2006.01) |

(52) U.S. Cl.
CPC ............. *G05G 25/04* (2013.01); *B60K 37/06* (2013.01); *B66C 13/56* (2013.01); *E02F 9/2004* (2013.01); *F16J 15/06* (2013.01); *G05G 9/047* (2013.01); *G05G 2009/04774* (2013.01)

(58) Field of Classification Search
CPC ................... G05G 25/04; G05G 9/047; G05G 2009/04774; G05G 1/06; F16J 15/06; E02F 9/2004; B66C 13/56; B60K 37/06; B25G 1/00; B25G 1/102
See application file for complete search history.

(56) References Cited

U.S. PATENT DOCUMENTS

| | | | | |
|---|---|---|---|---|
| 3,126,467 A | * | 3/1964 | Stevens, Jr. .......... | H01H 9/0214 174/564 |
| 3,472,983 A | * | 10/1969 | Lyons .................... | A61C 17/40 200/302.1 |
| 3,654,415 A | * | 4/1972 | Hawkins .............. | H01H 9/0214 200/302.3 |
| 3,870,099 A | * | 3/1975 | Wolowodiuk ........... | F16J 15/06 165/158 |
| 4,105,882 A | * | 8/1978 | Ulbing ................. | H01H 9/0214 200/1 V |

(Continued)

FOREIGN PATENT DOCUMENTS

FR 2943454 A1 9/2010

Primary Examiner — Joseph M Rocca
Assistant Examiner — Timothy Wilhelm
(74) Attorney, Agent, or Firm — Banner & Witcoff, Ltd.

(57) ABSTRACT

This sealed joystick for a machine comprises a function block, an outer shell formed by joining two rigid half-shells, these half-shells tightly enclosing the function block, each half-shell comprising a joint surface for this purpose all along its perimeter following a three-dimensional path which terminates on itself and which extends in the three dimensions of space, a sealing element comprising a one-piece block of elastomer material combining a sealing cord and a ring seal of different transverse cross-section within this same block to ensure that the joint surfaces are watertight.

20 Claims, 3 Drawing Sheets

(56) References Cited

U.S. PATENT DOCUMENTS

| | | | |
|---|---|---|---|
| 4,654,493 A | 3/1987 | Drager et al. | |
| 5,042,314 A * | 8/1991 | Rytter | B62D 1/12 180/333 |
| 5,900,603 A * | 5/1999 | Brush | H01H 23/06 200/293.1 |
| 6,145,401 A * | 11/2000 | Brush | F16H 59/02 74/473.12 |
| 6,307,466 B1 * | 10/2001 | Ferris | B01D 46/0086 116/268 |
| 6,425,729 B1 * | 7/2002 | Coutant | B66C 13/56 414/685 |
| 6,550,562 B2 * | 4/2003 | Brandt | E02F 9/2004 180/333 |
| 6,572,351 B2 * | 6/2003 | Durand | F01O 21/104 418/149 |
| 6,580,418 B1 * | 6/2003 | Grome | G05G 9/047 345/161 |
| 6,655,229 B2 * | 12/2003 | Yamamoto | F15B 13/0422 137/636.2 |
| 7,275,616 B2 * | 10/2007 | Link | A01D 41/127 180/333 |
| 7,293,625 B2 * | 11/2007 | Kumazawa | B66C 13/56 180/333 |
| 7,659,883 B2 * | 2/2010 | Hsu | G06F 3/0338 345/156 |
| 8,151,928 B2 * | 4/2012 | States | G01D 5/145 180/315 |
| 8,397,844 B2 * | 3/2013 | Vasant | B60K 1/04 180/65.1 |
| 9,132,855 B2 * | 9/2015 | Bertsch | B62D 11/003 |
| 2002/0155014 A1 | 10/2002 | Durand et al. | |
| 2002/0178624 A1 * | 12/2002 | Yamamoto | E02F 9/2004 37/348 |
| 2006/0278514 A1 * | 12/2006 | Roussin-Bouchard | H01H 9/06 200/512 |
| 2008/0308400 A1 * | 12/2008 | States | G01D 5/145 200/6 A |
| 2015/0020635 A1 * | 1/2015 | Tokuda | G05G 1/06 74/486 |
| 2015/0253806 A1 * | 9/2015 | Astrom | G05G 5/05 74/471 XY |
| 2016/0129966 A1 * | 5/2016 | Meggiolan | B62L 3/023 74/491 |

\* cited by examiner

SEALED JOYSTICK FOR THE CONTROL OF A MACHINE, SEALING ELEMENT FOR THAT JOYSTICK AND A CONTROL PANEL INCORPORATING THAT JOYSTICK

CROSS REFERENCE TO RELATED APPLICATION(S)

This application claims priority to French Application No. FR1556938, filed Jul. 22, 2015, entitled "POIGNÉE ÉTANCHE DE PILOTAGE D'UNE MACHINE, ÉLÉMENT D'ÉTANCHÉITÉPOUR CETTE POIGNÉE ET PUPITRE DE COMMANDE COMPORTANT CETTE POIGNÉE," which is incorporated herein by reference in its entirety.

FIELD OF THE INVENTION

The invention relates to a sealed joystick for the control of a machine. The invention also relates to a control panel for a machine incorporating that joystick, together with a sealing element for that joystick.

BACKGROUND OF THE INVENTION

In a known way, there are known joysticks for the control of a machine comprising a function block provided with a mechanical member which can be moved directly by the hand of a user to initiate dispatch of a command controlling the machine or a display of information on the present status of the controlled machine, an outer shell formed by joining two rigid half-shells, these half-shells tightly enclosing the function block each on their respective sides, each half-shell comprising for this purpose a joint surface all along its perimeter which follows a three-dimensional path terminating on itself and extending in the three dimensions of space, this joint surface, bearing against the corresponding joint surface of the other half-shell in a first joint zone, and bearing against the periphery of the function block in a second joint zone, this second joint zone being contiguous with the first joint zone, a sealing element comprising a sealing cord extending continuously along the three-dimensional path between the joint surfaces in the first joint zone, to ensure that this first joint zone is watertight, and a ring seal taking a complete turn around the function block and located at the second joint zone to ensure that this second joint zone is watertight, this annular seal having a transverse cross-section which differs from the transverse cross-section of the sealing cord.

In known joysticks the joint surfaces have a complex three-dimensional shape, particularly because of ergonomic considerations. Furthermore, typically, the sealing cord and the ring seal have different transverse cross-sections. Thus in these known joysticks the sealing cord and the ring seal are two separate parts which are mechanically independent of each other because the first and second joint zones have very different shapes. Through the use of such seals, instead of an adhesive or a similar product, the joystick can be easily dismantled during maintenance operations on the joystick, and then reassembled using the same parts. Manufacture of the seals is also simple and inexpensive. In addition to this, maintenance can be carried out manually and without the need for complicated and costly equipment. Finally the dimensions and weight of the joystick are reduced to a minimum. However it has been found that these joysticks are not wholly satisfactorily watertight. For example it has been found during tests that water droplets have succeeded in penetrating within the joystick, which could for example damage functioning of the function block.

There is therefore a need for a control joystick for a machine which has the same advantages as known joysticks while being more watertight.

SUMMARY OF THE INVENTION

The invention therefore relates to such a joystick in which the sealing element comprises a single block of elastomer material which combines the sealing cord and the ring seal in this same block.

The inventors have discovered that in the place where the first and second joint zones meet, contact between the sealing cord and the ring seal is not always perfect. In some cases it has been found that there is a gap between the two seals at this location through which water penetrates within the joystick.

By using a sealing element combining the cord and ring seals within the same block of material it is impossible for such an empty space to appear at the junction between the first and second joint zones. Furthermore the use of this one-piece sealing element makes it possible to retain the advantages of known joysticks.

Embodiments of the joystick may also have the following advantages:
  the orientation of the ring seal which is substantially perpendicular to the end of the sealing cord, in the absence of any external stress, makes it easier to fit the sealing element. In fact when the joystick is assembled there is no need to twist the ring seal in relation to the rest of the sealing element.
  the groove helps to hold the sealing element in place and compresses it, improving the seal.
  a sealing element hardness of between 30 Shore A and 90 Shore A makes it possible to have a sealing element which is easily compressible but remains quite rigid so that it is still simple to install.

The invention also relates to a control panel for a machine which has to be controlled, this panel comprising:
  a dashboard,
  the claimed sealed joystick for control of the machine, this joystick comprising a function block provided with a mechanical part which can be moved directly by the hand of a user to cause a command to be dispatched for control of the machine or a display of information on the current status of the controlled machine,
  a mechanical connection interface between the joystick and the dashboard, this interface being mechanically attached to the dashboard on the one side and to the joystick on the other.

The invention also relates to a sealing element for the claimed joystick, this element comprising a sealing cord extending, in the absence of any external stress, continuously along a three-dimensional path identical to the three-dimensional path along which the joint surfaces in the first joint zone extend, this sealing cord being capable of ensuring that this first joint seal is watertight when the joystick is in its assembled position, and a ring seal extending, in the absence of any external stress, continuously along a three-dimensional path identical to the three-dimensional path along which the joint surfaces at the second joint zone extend, this ring seal being capable of ensuring that this second joint zone is watertight and having a transverse cross-section which differs from the transverse cross-section of the sealing cord, in which the sealing element comprises a one-piece block of elastomer material combining the sealing cord and the ring seal in this same block.

BRIEF DESCRIPTION OF THE DRAWINGS

The invention will be better understood from a reading of the following description provided purely by way of a non-limiting example with reference to the drawings, in which.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

In these figures the same reference numbers are used to indicate the same elements. In the remainder of this description characteristics and functions which are well known to those skilled in the art will not be described in detail.

Figure 1:
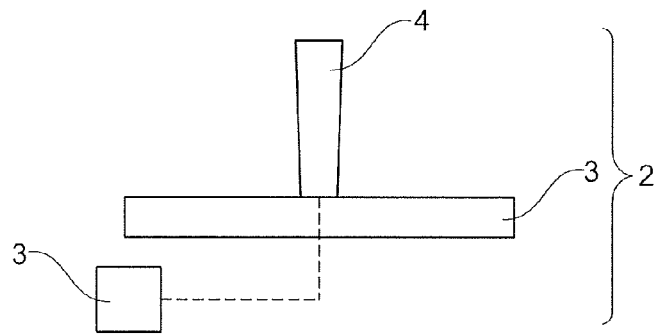
FIG. 1 is a diagrammatical illustration of a control panel for a machine.

FIG. 1 represents a control panel 2 for a machine which has to be controlled. For example this machine is an aircraft such as a helicopter.

This control panel 2 comprises a dashboard 3 equipped with a man-machine interface to control the machine. This interface is connected to a unit 3 controlling the machine to deliver a command controlling the machine when it is activated. In particular the man-machine interface comprises a joystick 4.

Figure 2:
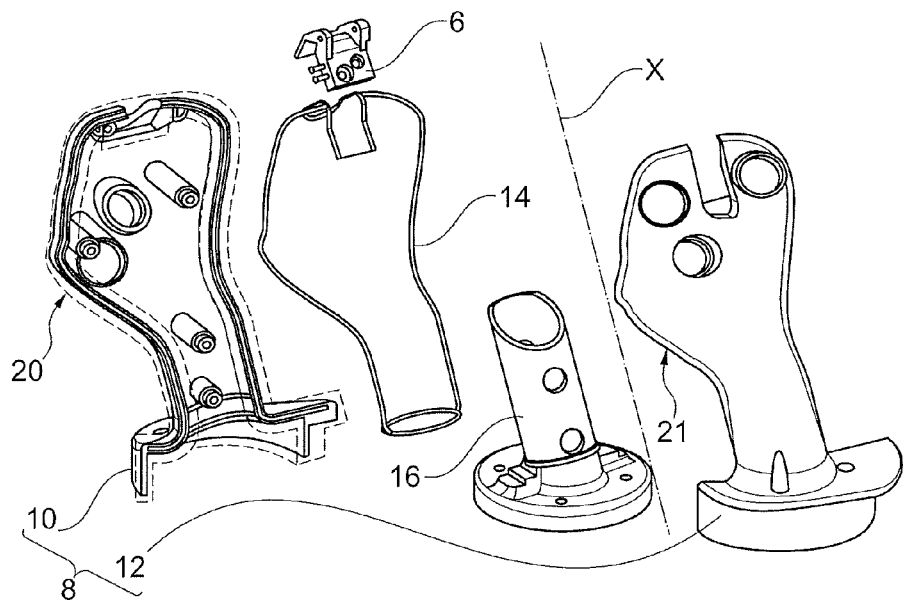
FIG. 2 is a diagrammatical illustration in an exploded view of a joystick for the control panel in FIG. 1.

FIG. 2 illustrates an embodiment of joystick 4. Here this joystick 4 comprises:
a function block 6;
a rigid outer shell 8 formed by joining two half-shells 10, 12;
a sealing element 14;
an interface 16 connecting to dashboard 3.

In this example joystick 4 is a joystick that is intended to be held in the hand of a user of the machine. This joystick extends essentially along an X axis which is for example perpendicular to dashboard 3 when joystick 4 is not moved by the user. This joystick can be moved with at least one degree of freedom to pivot in relation to dashboard 3. Block 6 and interface 16 are here located at the two opposite ends of joystick 4.

6 is provided with a mechanical part (not illustrated in the figures) which can be moved by one of the user's fingers. Block 6 is electrically connected to unit 3 by means of a wire connection. For example it is an electromechanical switch which can be moved between two stable positions. Selective movement of this switch between its stable positions makes it possible to control and, alternately, inhibit the control command for the machine.

In this example the two half-shells 10, 12 tightly enclose block 6, each on one side respectively of this block 6. Likewise they tightly enclose interface 16.

Half-shells 10 and 12 each have rigidity such that their Young's modulus is 10 GPa or 20 GPa or more at 25□C. Here these half-shells 10 and 12 are made of thermohardening or thermoplastic plastics material or cast aluminum.

The purpose of element 14 is to ensure that joystick 4 is watertight and dust-tight and will be described in greater detail below. Element 14 prevents water spray and dust from penetrating within shell 8 when joystick 4 is assembled. For example, joystick 4 has a sealing capacity greater of or higher than protection index "IP 66" as defined by standard IEC 60529 by the International Electrotechnical Commission.

Each half-shell 10, 12 comprises a joint surface all along its outer perimeter which follows a three-dimensional path in space and which terminates upon itself. A three-dimensional path is a path extending along at least three non-coplanar directions in space. The respective joint surfaces of half-shells 10 and 12 have the reference numbers 20 and 21 respectively. In the assembled position of joystick 4 these surfaces 20, 21 face each other.

Shell 8 therefore has a three-dimensional shape, selected in particular on the basis of ergonomic criteria to allow it to be easily held in the hand of a user. Because of this the three-dimensional path followed by surfaces 20, 21 is generally complicated and irregular. In particular this path does not extend in a single plane in space. Here this path has sections in the form of non-linear and non-constant curves.

Figure 3:
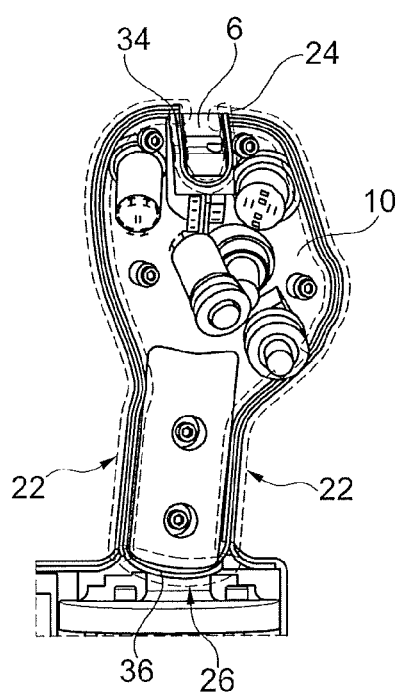
FIG. 3 is a diagrammatical illustration in cross-sectional view of part of the joystick in FIG. 2.

When half-shells 10 and 12 are assembled together to form shell 8 surface 20 then bears simultaneously against:
corresponding surface 21 in joint zone 22 (FIG. 3),
the periphery of block 6 in joint zone 24 (FIG. 3), and
the periphery of interface 16 in joint zone 26 (FIG. 3).
The same applies to surface 21 with regard to surface 20.

Joystick 4 is mechanically attached to control panel 2 through interface 16. Advantageously interface 16 also acts as a mechanical reinforcement to prevent shell 8 from breaking when joystick 4 is moved by the user.

Here interface 16 takes the form of an essentially tubular member extending along the X axis. One end of this piece is attached to shell 8 without any degree of freedom. The other end of this piece is attached to dashboard 3 without any degree of freedom. Thus in this example shell 8 is not directly attached to control panel 2. Here interface 16 also allows the wire connection connecting block 6 to unit 3 to pass through.

In FIG. 3 element 14 is shown in its position mounted on half-shell 10 in the absence of half-shell 12. However half-shells 10 and 12 are present when joystick 4 is intended to be used.

4 shows element 14 in greater detail, in the absence of any external stress. In particular, in FIG. 4 element 14 is illustrated in the conformation which it adopts in the absence of any force on joint surfaces 20, 21. Element 14 comprises a one-piece block made of elastomer material. Advantageously element 14 has a hardness, measured on the Shore scale, of between 30 Shore A and 90 Shore A. Preferably this hardness lies between 60 Shore A and 75 Shore A. For example element 14 is of rubber. Element 14 comprises here a sealing cord 32 and ring seals 34 and 36. Seals 32, 34 and 36 are combined in the same block of material and therefore form just one piece. They are of one piece with each other.

Seal 32 is shaped to extend continuously along zone 22 and ensure that half-shells 10 and 12 are watertight in this zone 22. Here seal 32 has a transverse cross-section of circular shape over its entire length. In the absence of any external stress it follows a three-dimensional path identical to the three-dimensional path of joint surfaces 20, 21 within zone 22.

Seal 34 is shaped so as to make a full turn around block 6 and ensure that half-shells 10 and 12 and block 6 are watertight in zone 24. For this purpose seal 34 is a flat seal of rectangular transverse cross-section. In the absence of any external stress it follows a three-dimensional path identical to the three-dimensional path of joint surfaces 20, 21 within zone 24. In this embodiment, straight segments of seal 34 to which the ends 40 of seal 32 are connected extend parallel to a direction D34. Ends 40 extend parallel to a direction D32-1 which here makes an angle of 90°, to within more or less 45° or 20° or 15°, with direction D34. Here this angle is equal to 90°.

Figure 4:
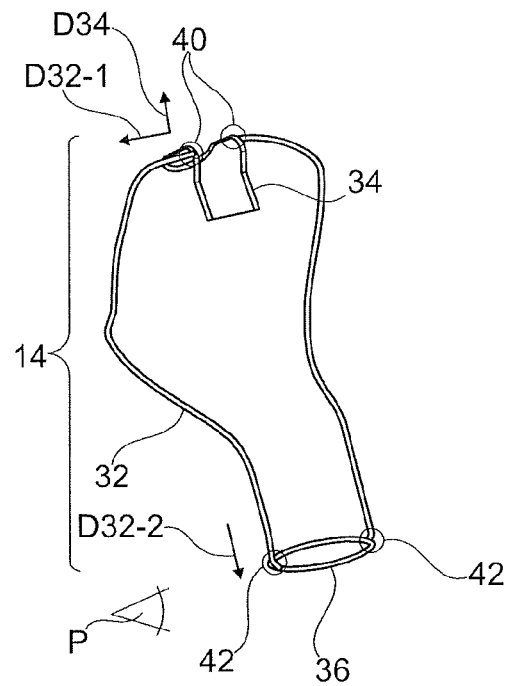
FIG. 4 is a diagrammatical illustration of a sealing element for the joystick in FIG. 2.

Finally seal 36 is shaped so as to make a full turn around interface 16 and ensure that half-shells 10 and 12 and interface 16 are watertight within zone 26. For this purpose seal 36 here has the shape of an essentially circular ring. In the absence of any external stress it follows a three-dimensional path identical to the three-dimensional path of joint surfaces 20, 21 within zone 26. For example, seal 36 is an O-ring of circular or ellipsoidal transverse cross-section extending essentially within a plane P, as illustrated in FIG. 4. Ends 42 of seal 32 are directly attached to seal 36. Here ends 42 are located opposite ends 40. Ends 42 extend parallel to a direction D32-2 which makes an angle with plane P which is 90☐, to within more or less 45° or 20° or 15°. Here this angle is 90°.

By using a sealing element combining the cord and ring seals in the same block of material the appearance of empty spaces at the junction between the different joint zones is prevented. Furthermore assembly and dismantling of the joystick are rendered easier. In fact there is just one sealing element which has to be fitted, instead of having to fit several seals which are mechanically independent of each other at different locations on the joystick. Furthermore there is no need to connect the various seals with adhesive (glue, potting compound, etc.) to ensure continuity of the seal.

In this example directions D32-1, D32-2 and D34 and the position of plane P are identical to the directions and plane corresponding to the three-dimensional path along which joint surfaces 20, 21 extend. Thus when joystick 4 is assembled and before it is trapped between the joint surfaces element 14 naturally bears against joint surface 20 or 21 without it being necessary to twist seals 34 and 36 in order to do this. The fact that there is no need to twist seals 34 and 36 prevents sealing cord 32 from twisting upon itself The appearance of a sealing defect caused through the twisting of sealing cord 32 is prevented in this way.

Figure 5:
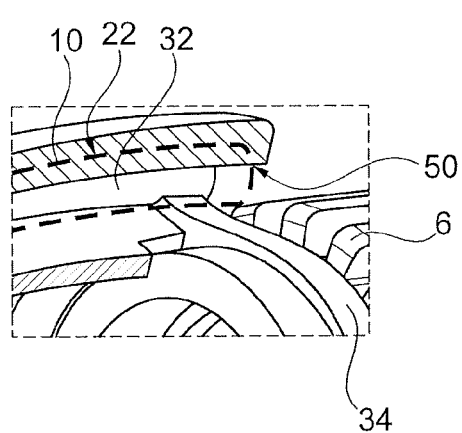
FIGS. 5 and 6 are diagrammatical illustrations in closer view of parts of the joystick in FIG. 3.
Figure 6:
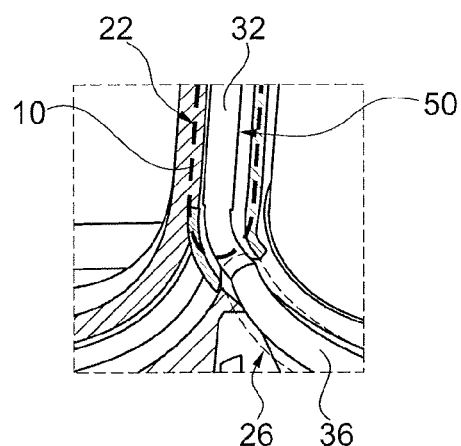

FIGS. 5 and 6 show the ends 40 and 42 respectively in greater detail when element 14 is assembled with half-shell 10.

Advantageously one and/or the other of half-shells 10, 12 has a groove 50 made within the joint surface to receive only part of the transverse cross-section of element 14. Element 14 can be compressed in this way. This compression improves the seal in joystick 4.

Here half-shell 10 incorporates groove 50 (FIGS. 5 and 6) which follows the three-dimensional path of joint surface 20. This groove 50 receives seals 32, 34 and 36. For this purpose the transverse cross-section of groove 50 is in the shape of a semi-circle in zones 22 and 26 and rectangular in zones 24 to match the shape of the transverse cross-section of seals 32, 34 and 36. The depth of groove 50 only enables part of element 14 to be inserted. Thus this element 14 is compressed on assembly. Here the depth of groove 50 is set to achieve a reduction of between 5 and 30% in the thickness of element 14 in a direction perpendicular to the joint surface when half-shells 10 and 12 are assembled. Preferably compression of seals 32, 34 and 36 is uniform.

Advantageously element 14 is manufactured by molding in a mold which reproduces as a hollow the three-dimensional path which element 14 has to follow when it is trapped between joint surfaces 20, 21. Thus the manufacturing cost is reduced because seal 32 is of the correct length and there are no useless excess lengths which result in wastage of material.

Figure 7:
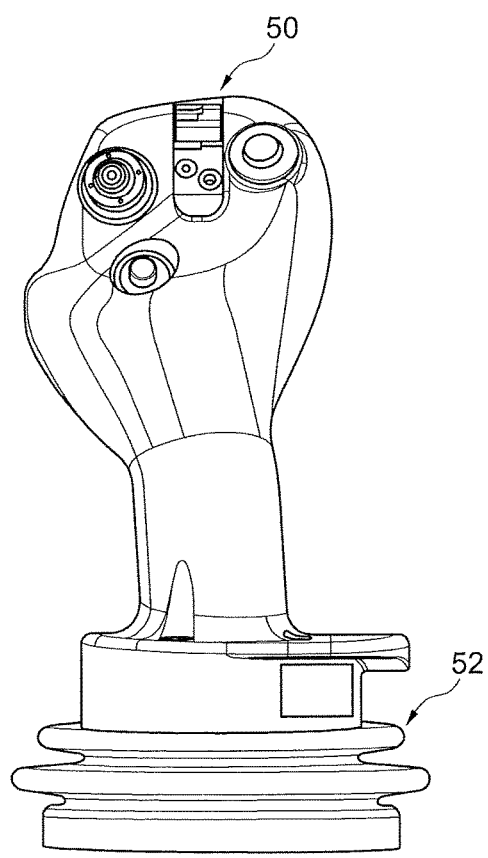
FIG. 7 is a diagrammatical illustration of the front view of another embodiment of a joystick.

FIG. 7 illustrates a joystick 50 identical to joystick 4 with exception that sealing element 14 is replaced by a sealing element 52.

Figure 8:
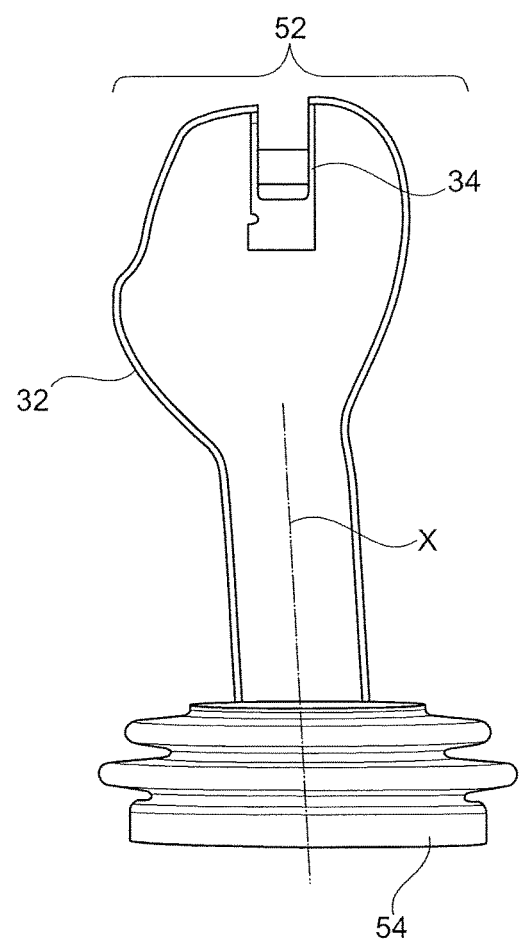
FIG. 8 is a diagrammatical illustration in front view of a sealing element for the joystick in FIG. 7.

FIG. 8 illustrates sealing element 52 in greater detail. Element 52 is identical to element 14 except that ring seal 36 is replaced by a ring seal 54. Ring seal 54 is here a bellows seal. Seal 54 therefore comprises a wall with accordion-type folds which allow it to deform over more than 2 mm or 5 mm or 1 cm while continuing to provide the required seal. For example seal 54 can elongate in the direction parallel to the X axis. Such an elongation of at least part of seal 54 can be caused by lateral movement of joystick 50 on the X axis or by the pivoting of joystick 50 about an axis perpendicular to the X axis and attached to dashboard 3.

Any other embodiments are possible. For example joystick 4 may be of different shape.

For example, it may be a steering wheel, which can turn with a degree of freedom in rotation about the X axis. Interface 16 is then replaced by an interface connecting the steering wheel to dashboard 3 which enables it to rotate. In this case seal 36 is omitted from element 14 because the steering wheel connection is then not clamped between the two half-shells. In fact, typically, the half-shells correspond to the front and rear parts of the steering wheel, facing the user and dashboard 3 respectively. Thus only the rear half-shell clamps the periphery of interface 16. The annular seal which provides a seal between this rear half-shell and the interface is therefore not attached to seal 32.

The position of block 6 and/or interface 16 on joystick 4 may be different, in particular in relation to the shape of the joystick.

Joystick 4 includes other components, such as additional function blocks placed within openings enclosed by two half-shells 10, 12 and located along zones 20 and 21, then these half-shells incorporate additional joint zones. In this case element 14 is provided with additional seals that ensure that these additional joint zones are watertight. For example these additional seals are identical or similar to seal 34. In particular these additional seals are formed in the same block of material and of one piece with seals 32, 34 and 36.

As a variant the shapes of the seals in element 14 are different. For example joint 32 or 36 is replaced by a flat seal. As a variant seal 34 or 36 is a four-lobed seal. This is particularly advantageous when the part for which they are providing the seal (for example interface 16 in the case of seal 36) can move in rotation in relation to shell 8.

Interface 16 may be omitted. For example it may be replaced by a bundle which is attached to at least one of half-shells 10 and 12 without any degree of freedom. As a variant shell 8 may be directly mechanically connected to dashboard 3. This is particularly the case of joysticks in some aircraft. This is made possible by the fact that in this case safety regulations require that shell 8 has significant rigidity. This rigidity is so great that shell 8 can be connected to the dashboard without passing through an interface 16. If interface 16 is omitted then seal 36 and zone 26 are omitted.

There are many different function blocks which might replace block 6. For example a function block may only comprise a display of information on the current status of the controlled machine. For example this display is a back-lit plate which cannot be moved by the user's hand.

The machine is not necessarily a helicopter. It may be an aircraft or a glider or a control device of an unmanned aerial vehicle such as a drone. As a variant the machine may not be an aircraft. For example it may be a site or earth-moving vehicle, a boat, a handling device, a wheelchair or a crane.

Surfaces 20, 21 may have a different shape and in particular follow a three-dimensional path that differs from that illustrated in the figures. In this case the shape of element 14 will match this new three-dimensional path.

What is claimed is:

1. A sealed joystick for the control of a machine, comprising:
   a function block provided with a mechanical piece which can be moved directly by the hand of a user to dispatch a command for control of the machine or a display of information on the current status of the controlled machine;
   an outer shell formed by joining two rigid half-shells these half-shells tightly enclosing the function block, each on their respective sides, each half-shell having for the purpose a joint surface along its entire perimeter following a three-dimensional path which terminates on itself and which extends in three dimensions in space, wherein the joint surface:
   is physically adjacent to-the corresponding joint surface of the other half-shell in a first joint zone; and
   is physically adjacent to the periphery of the function block in a second joint zone, the second joint zone being contiguous with the first joint zone;
   a sealing element comprising:
   a sealing cord extending continuously along the three-dimensional path between the joining faces within the first joint zone to ensure that the first joint zone is watertight; and
   a ring seal making a complete turn about the function block and located within the second joint zone to ensure that the second joint zone is watertight, the ring seal having a transverse cross-section which differs from the transverse cross-section of the sealing cord, wherein the sealing element comprises a block of one piece of elastomer material combining the sealing cord and the ring seal in the same block.

2. The joystick of claim 1, wherein the ring seal comprises at least one segment that is directly mechanically attached to one end of the sealing cord, the segment extending parallel to a first direction in the absence of any exterior stress, the end extending, in the absence of any exterior stress, parallel to a second direction forming an angle with the first direction from about 90° to about 45°.

3. The joystick as claimed in claim 1, wherein the joystick comprises a connecting interface to a dashboard;
   the two half-shells each tightly enclose, on their respective sides, both the function block and the connecting interface, the joint surface of each half-shell bearing for this purpose on the periphery of the connecting interface in a third joint zone; and
   wherein the sealing element further comprises an additional ring seal making a complete turn around the connecting interface; the additional ring-located within the third joint zone to ensure that the third zone is watertight, wherein the additional ring seal is attached to the sealing cord and the ring seal of the sealing element in a same block of elastomer material.

4. The joystick of claim 3, wherein the additional ring seal makes a complete turn about an axis and has at least one symmetry of rotation about that axis, and wherein an additional end of the sealing cord being directly attached to the additional ring seal, and the additional end extending, in the absence of any external stress, along a direction in space making an angle from about 90° to about 45° , with a plane perpendicular to the axis.

5. The joystick of claim 1, wherein at least one of the two half-shells has a groove formed within its joint surface, and wherein the sealing element is inserted into the groove along the first and second joint zones.

6. The joystick of claim 1, wherein the sealing element has a hardness on the Shore scale of between 30 Shore A and 90 Shore A.

7. The joystick of claim 1, wherein the ring seal is one of an O-ring, a flat seal, or a bellows seal.

8. The joystick of claim 1, wherein the sealing cord has a cross-section of one of a circular shape, or a square shape, or an elliptical shape.

9. The control panel of claim 1, wherein the sealing cord has a cross-section of one of a circular shape, a square shape, or an elliptical shape.

10. A control panel for a controlling a machine, the control panel comprising:
    a dashboard,
    a sealed joystick for controlling the machine, the joystick comprising:
    a function block provided with a mechanical piece, which can be directly moved by the hand of a user to dispatch a command to control the machine or a command to initiate a display of information corresponding to a current status of the controlled machine;
    a sealing cord extending, in the absence of any external stress, continuously along a three-dimensional path corresponding to first joint surfaces extending in a first joint zone formed by joining two rigid half-shells that form an exterior surface of the joystick forming a watertight seal; and
    a ring seal extending, in the absence of any external stress, continuously along a three-dimensional path corresponding to second joint surfaces extending within a second joint zone formed by joining the two rigid half-shells around the function block, the ring seal forming a watertight seal, wherein the sealing cord and the ring seal are combined in a single element of an elastomer material; and
    an interface mechanically connecting the joystick to the dashboard, the interface being mechanically attached to the dashboard on a first side and to the joystick on a second side.

11. The control panel of claim 10, wherein the ring seal makes a complete turn about the function block, said ring seal having a transverse cross-section which differs from the transverse cross-section of the sealing cord.

12. The control panel of claim 11, wherein the ring seal comprises at least one segment that is directly mechanically attached to one end of the sealing cord, the segment extending parallel to a first direction in the absence of any exterior stress, the end of the sealing cord extending, in the absence of any exterior stress, parallel to a second direction forming an angle with the first direction from about 90° to about 45°.

13. The control panel of claim 11, wherein at least one of the two half-shells has a groove formed within its joint surface, and wherein the sealing element is inserted into the groove along the first and second joint zones.

14. The control panel of claim 11, wherein the sealing element has a hardness on the Shore scale of between 30 Shore A and 90 Shore A.

15. The control panel of claim 11, wherein the ring seal is one of an O-ring, a flat seal, or a bellows seal.

16. The control panel of claim 10, wherein the two half-shells each tightly enclose, on their respective sides, both the function block and the interface, the joint surface of each half-shell bearing for this purpose on the periphery of the interface in a third joint zone; and wherein the sealing element further comprises an additional ring seal making a complete turn around the interface; the additional ring located within the third joint zone to ensure that the third zone is watertight, wherein the additional ring seal is attached to the sealing cord and the ring seal of the sealing element in a same block of elastomer material.

17. The control panel of claim 16, wherein the additional ring seal makes a complete turn about an axis and has at least one symmetry of rotation about that axis, and wherein an additional end of the sealing cord being directly attached to the additional ring seal, and the additional end extending, in the absence of any external stress, along a direction in space making an angle from about 90° to about 45°, with a plane perpendicular to the axis.

18. A sealing element for a joystick, the sealing element comprising:
a sealing cord extending, in the absence of any external stress, continuously along a three-dimensional path corresponding to first joint surfaces extending in a first joint zone formed by joining two rigid half-shells that form an exterior surface of the joystick, the sealing cord being capable of ensuring that the first joint zone is watertight when the joystick is in its assembled position, and
a ring seal extending, in the absence of any external stress, continuously along a three-dimensional path corresponding to second joint surfaces extending within a second joint zone formed by joining the two rigid half-shells around a function block, the ring seal being capable of ensuring that the second joint zone is watertight and having a transverse cross-section which differs from a transverse cross-section of the sealing cord, wherein the sealing element comprises a single element of an elastomer material that combines the sealing cord and the ring seal in the single element of the elastomer material.

19. The sealing element for the joystick of claim 18, wherein the two half-shells of the joystick each tightly enclose, on their respective sides, both the function block and an interface to a machine being controlled by the joystick, the joint surface of each half-shell bearing for this purpose on the periphery of the interface in a third joint zone and wherein the sealing element further comprises an additional ring seal making a complete turn around the interface; the additional ring seal being located within the third joint zone to ensure that the third joint zone is watertight, wherein the additional ring seal is attached to the sealing cord and the ring seal of the sealing element in the single element of elastomer material.

20. The sealing element for the joystick of claim 19, wherein the additional ring seal makes a complete turn about an axis and has at least one symmetry of rotation about that axis, and wherein an additional end of the sealing cord being directly attached to the additional ring seal, the additional end extending, in the absence of any external stress, along a direction in space making an angle from about 90° to about 45°, with a plane perpendicular to the axis.

* * * * *